June 1, 1937. A. S. CAMPBELL 2,082,732
LICENSE PLATE FRAME
Filed Oct. 26, 1935 2 Sheets-Sheet 1
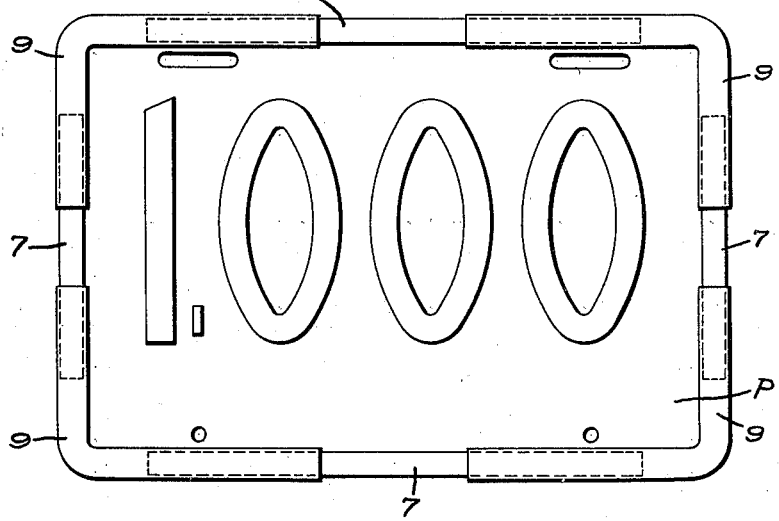
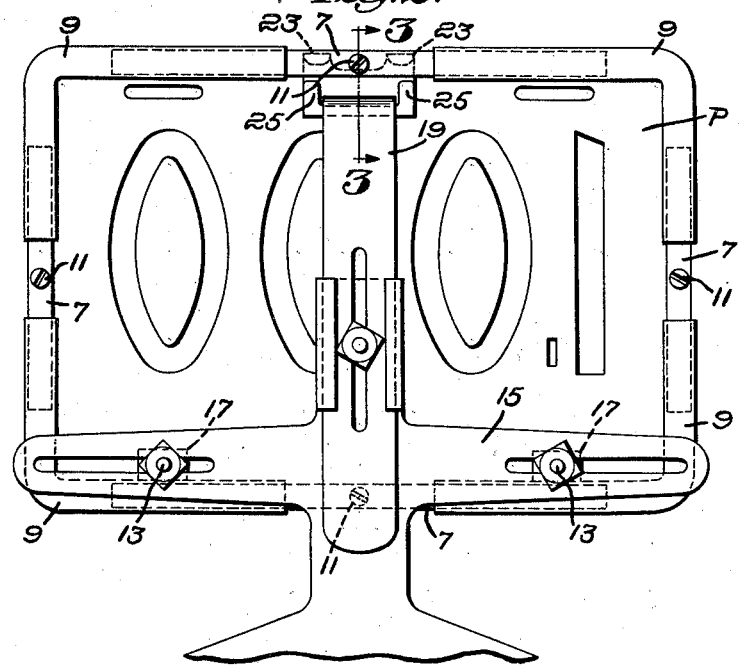
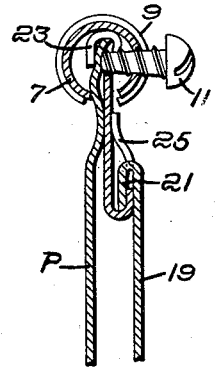
Inventor:
Alphonso S. Campbell, June 1, 1937.                A. S. CAMPBELL                2,082,732
                          LICENSE PLATE FRAME
                          Filed Oct. 26, 1935              2 Sheets-Sheet 2
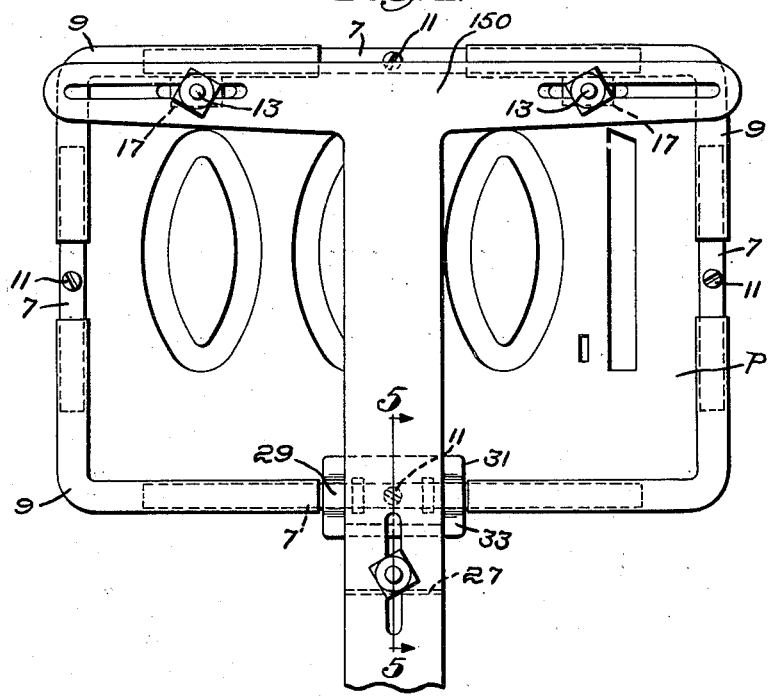
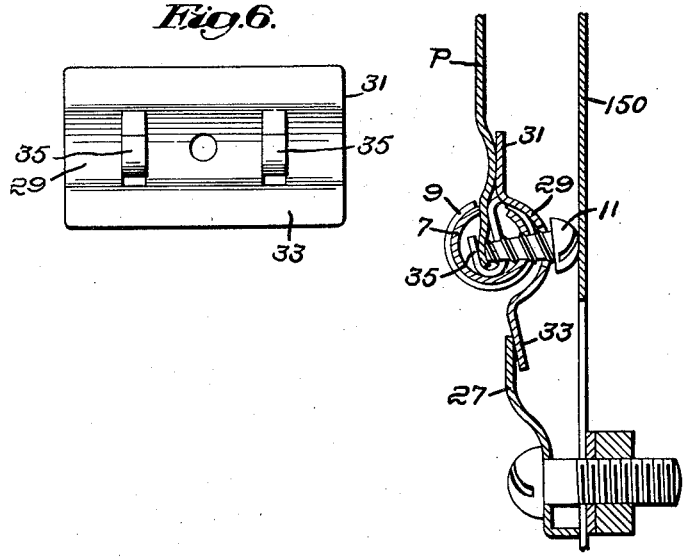
Inventor:
Alphonso S. Campbell,
by Emery, Booth, Townsend, Miller & Weidner Attys Patented June 1, 1937

2,082,732

UNITED STATES PATENT OFFICE 2,082,732

LICENSE PLATE FRAME

Alphonso S. Campbell, Winchester, Mass., assignor to A. S. Campbell Co., Inc., East Boston, Mass., a corporation of Massachusetts Application October 26, 1935, Serial No. 46,899

7 Claims. (Cl. 40—125)

This invention relates to frames for automobile license plates. The frame which I am about to describe is similar to that disclosed in my prior Patent No. 1,936,287, dated Nov. 21, 1933, in that it provides an adjustable frame of tubular sections adapted to fit about the margins of a license plate which in itself is supported directly from the vehicle. The object of the present invention is to provide a particularly inexpensive but attractive structure which may be very easily adjusted to the plate and the whole securely and firmly held.

My invention will be well understood by reference to the following description of an illustrative embodiment thereof shown by way of example in the accompanying drawings, wherein:—

Fig. 1 is a front elevation of a license plate with a frame illustrative of the invention applied thereto;

Fig. 2 is a rear elevation of the same mounted on a known form of bracket;

Fig. 3 is an enlarged section on the line 3—3 of Fig. 2;

Fig. 4 is a rear elevation showing the plate and frame mounted on another type of bracket;

Fig. 5 is an enlarged section on the line 5—5 of Fig. 4; and

Fig. 6 is an elevation of a securing clip shown in Figs. 4 and 5.

Referring to Fig. 1 of the drawings, the frame there shown comprises a circuit of hollow metal tubes herein including the straight sections 7 corresponding to the sides of the license plate P and alternating angular sections 9 corresponding to the corners of the plate but having legs of considerable length within which the ends of the straight sections freely telescope. The sections are split along their inner sides to receive the edges of a plate P as seen, for example, in Fig. 3. The various sections 7 and 9 are held together by the fact that the outer ones, such as the angular sections 9, embrace the others past their centers, but they are otherwise unconnected and capable of free telescopic movement axially.

To secure the frame to the plate and maintain the sections in this assembled relation I utilize set screws 11 which need be associated only with alternate sections, preferably the straight sections 7. The screws 11, which may be of the self-tapping type consisting essentially of a case-hardened wood screw, may pass through the rear walls of the sections 7 at their centers, passing through a single thickness of metal only, and each independent of any section save the one in which it is tapped. Their ends are adapted to engage the edge of the plate P within the hollow of this section. Such plates are usually beaded around their margins and the end of the set screw engages such bead. The various sections may be quickly assembled around the plate and adjusted and the straight sections clamped thereto by the set screws and these sections will in turn hold the angular sections 9 immovably in position. The wide arc of the bearings of the sections on one another holds the angular sections securely. The screws are disposed at the rear of the plate and are entirely invisible from the front, as seen in Fig. 1, providing a neat and attractive appearance.

The various sections of the plate slide freely on each other and no particular manipulation is required in fitting them on the plate, and when once adjusted in proper position they are very quickly and securely clamped by the set screws. A central position of these screws as in the embodiment shown provides for a wide range of adjustment since obviously, referring to Fig. 3, the ends of the angular sections 9 could be brought up almost into contact at either side of the set screw or drawn outwardly until they barely overlapped the ends of the straight sections.

The plate with the enclosing frame may be secured by means of bolts 13 which pass through the openings provided in the plate for this purpose and are engaged with a suitable support on the automobile such as the cross-bar 15 (Fig. 2) or 150 (Fig. 4) of a mounting bracket provided for such purpose, suitable spacing blocks or washers 17 being interposed between the cross-bar and the plate to compensate for the rearward overhang of the frame.

When a license plate is secured along a single line in this manner, a movement about such line as an axis giving rise to a disagreeable rattle is possible when the vehicle is on the road. License plate mounting brackets as commonly used on automobiles, therefore, frequently provide for a three-point engagement of the plate. To permit utilization of such brackets I provide members to hook over the edge of the plate at a side remote from that near which the bolts 13 are utilized, which members are received within a hollow tubular section 7 and project through the slot at its inner side to the rear of the plate P for engagement with the bracket.

In Figs. 2 and 3 I have shown a form of bracket 15 provided with a vertically adjustable upright 19 having a downwardly turned hook 21 at its upper end designed to embrace the upper edge of a license plate. Such hook is not of a size to engage about a frame, and if it were, it would break the line and spoil its appearance.

I provide a clip having hooks 23 adapted to embrace the edge of the plate within the hollow of the upper side section 7, straddling the set screw 11 which secures that section, and also having a body which projects out through the slot to underlie the rear of the plate, the end of the body being upturned and centrally cut away at 25 to provide a hook interengaging the hooked end 21 of the upright, which end is flanked by tongues at either side of the hook of the body.

The form of bracket shown in Figs. 4 and 5 is of T shape having the cross-bar 150 at its upper end to which the upper margin of the plate is bolted. The upright of the T is provided with an adjustable clamp 27 designed to overlie the lower edge of the license plate. Here again, if such a clamp were adjusted over the face of the frame, its appearance would be spoiled. I therefore provide a member which is herein shown as having a central bowed portion 29 adapted to overlie the rear of the lower section of the frame and wings 31 and 33 respectively providing a bearing against the rear face of the plate P and a projection projecting outwardly and downwardly beyond the frame to be engaged by the clamp 27. Tongues 35 struck from the body of the member are bent to form hooks which, as best shown in Fig. 5, extend through the slit of section 7 at the rear of the plate and embrace the edge of the plate within the hollow of the section at either side of the centrally located set screw 11.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

I claim:

1. A license plate frame comprising a circuit of freely telescoping, tubular sections split along their inner sides to provide for the reception of the margins of the plate therein and comprising angular sections and intervening straight sections and set screws associated with alternate sections only of said circuit at points substantially remote from the ends of the sections to provide a wide range of telescoping movement therebetween, said screws passing solely through the rear walls of the sections to engage the plate margins thereby to secure said sections to the plate and through them the other sections.

2. A license plate frame comprising a circuit of telescoping sections split along their inner sides to receive the margins of the plate, means for securing the sections about the plate in assembled relation, and a member extending through the split and having interiorly a hook portion adapted to embrace the edge of the plate received within the frame and exteriorly a bracket engaging portion.

3. A license plate frame comprising a circuit of telescoping sections split along their inner sides to receive the margins of the plate, means for securing the sections about the plate in assembled relation, and a member extending through the split and having interiorly a hook portion adapted to embrace the edge of the plate received within the frame and exteriorly a portion in part overlying the plate inwardly of the frame and in part projecting outwardly beyond the same for engagement with a bracket.

4. A license plate frame comprising a circuit of telescoping sections split along their inner sides to receive the margins of the plate, set screws for securing the sections to the plate in assembled relation, and a member entering the split portion and having interiorly thereof spaced hooks to embrace the margin of the plate received in the frame at either side of a screw and exteriorly a bracket engaging portion.

5. A license plate frame comprising a circuit of telescoping sections split along their inner sides to receive the margins of the plate, set screws for securing the sections to the plate in assembled relation, and a member entering the split portion and having interiorly thereof spaced hooks adapted to embrace the margin of the plate received within the frame at either side of a screw and exteriorly parts projecting inwardly and outwardly to provide respectively a bearing against the rear of the plate and an abutment for a bracket clamp.

6. A license plate frame comprising a circuit of telescoping sections split along their inner sides to receive the margins of the plate, set screws for securing the sections to the plate in assembled relation, and a member entering the split portion and having interiorly thereof spaced hooks adapted to embrace the margin of the plate received within the frame at either side of a screw and exteriorly a part projecting inwardly and recurved, the overlying part of the recurved portion being centrally cut away.

7. A license plate frame comprising a circuit of telescoping sections split along their inner sides to receive the margins of the plate, means for securing the sections to a plate in assembled relation, and a member having a central portion to overlie the frame and terminal portions extending beyond the same to provide respectively a bearing against the rear of the plate and a bracket clamp, tongues struck from said member within the margins thereof and bent to extend through the split of the section for engagement about the edge of the plate within the same.

ALPHONSO S. CAMPBELL.